United States Patent [19]
Cini

[11] 3,743,456
[45] July 3, 1973

[54] ADJUSTABLE DIE HEADS FOR EXTRUDERS AND THE LIKE

[75] Inventor: Adrian V. Cini, Levittown, Pa.

[73] Assignee: Acme-Hamilton Manufacturing Corporation, Trenton, N.J.

[22] Filed: Aug. 20, 1971

[21] Appl. No.: 173,603

[52] U.S. Cl.................. 425/112, 425/133, 425/131, 425/192, 425/384
[51] Int. Cl............................................. B29d 23/04
[58] Field of Search.................... 425/112, 131, 133, 425/113, 192, 384

[56] References Cited
UNITED STATES PATENTS

| | | | |
|---|---|---|---|
| 3,677,676 | 7/1972 | Hegler | 425/112 X |
| 3,447,204 | 6/1969 | Lainson | 425/133 |
| 3,504,402 | 4/1970 | Wetz et al. | 425/131 |

Primary Examiner—Robert L. Spicer, Jr.
Attorney—Sidney G. Faber, Louis Weinstein et al.

[57] ABSTRACT

An adjustable die head for extruders and the like advantageous for use in forming corrugated tubing with or without an interior skim layer. The die head is secured to an extruder apparatus and utilizes a removable stock control spacer for controlling the rate of flow of stock from an annular shaped outlet. Separate conduits are provided within the extruder die head which communicate with air outlets arranged at longitudinally spaced intervals along the die head. A conduit is also provided for communication with stock outlet openings which are utilized to form the skim layer within the corrugated tubing. Adjustable collars are provided at axially spaced intervals along the die head for regulating the flow of air and stock through the aforesaid outlet openings or alternatively to cut off selected ones of the aforesaid flows, if desired.

4 Claims, 7 Drawing Figures

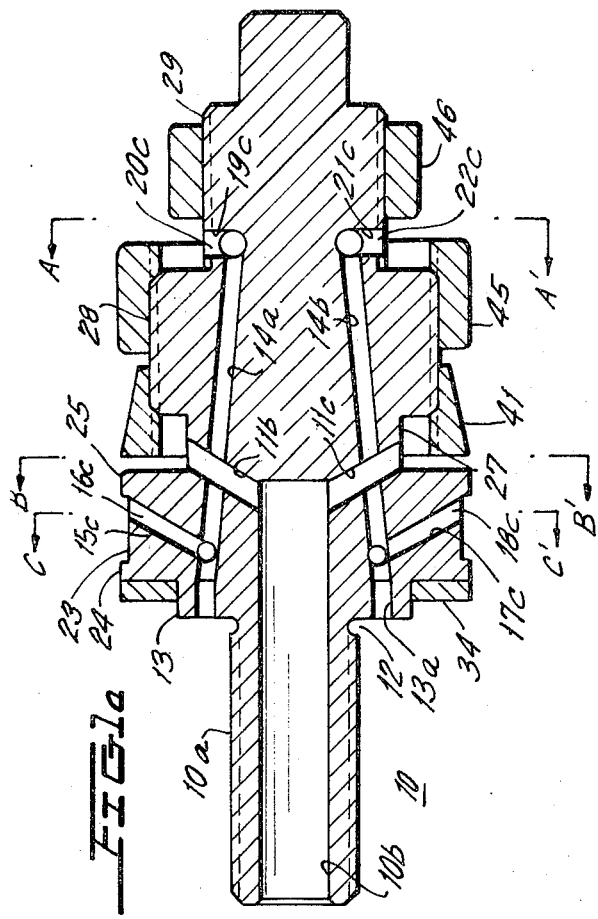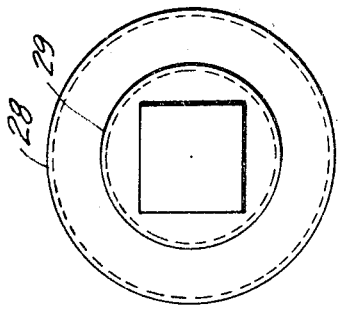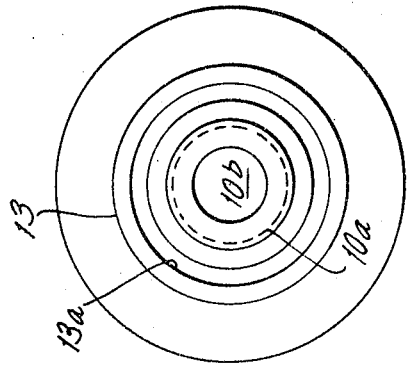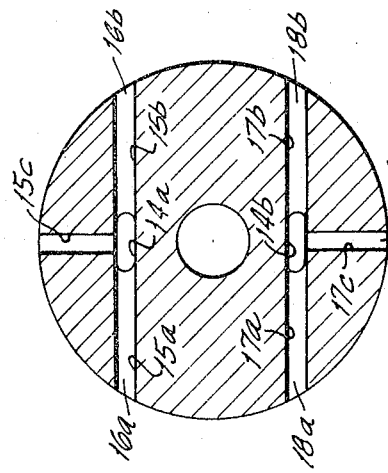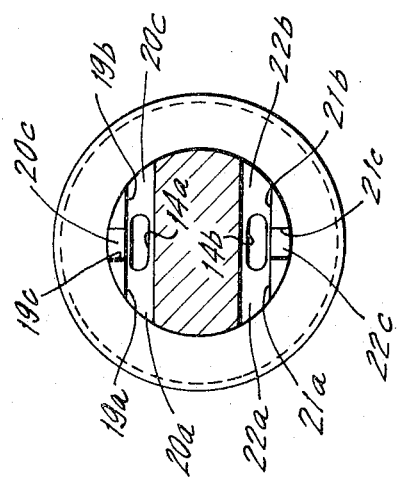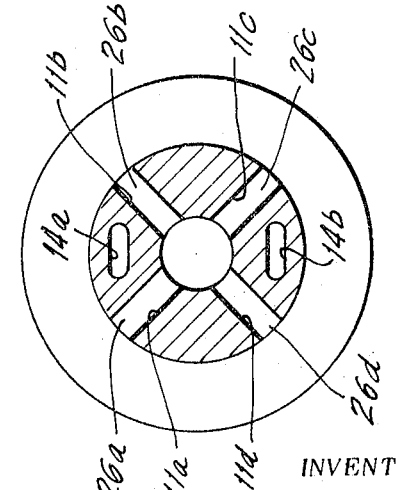
INVENTOR.
ADRIAN V. CINI
BY
Ostrolenk, Faber, Gerb & Soffen
ATTORNEYS

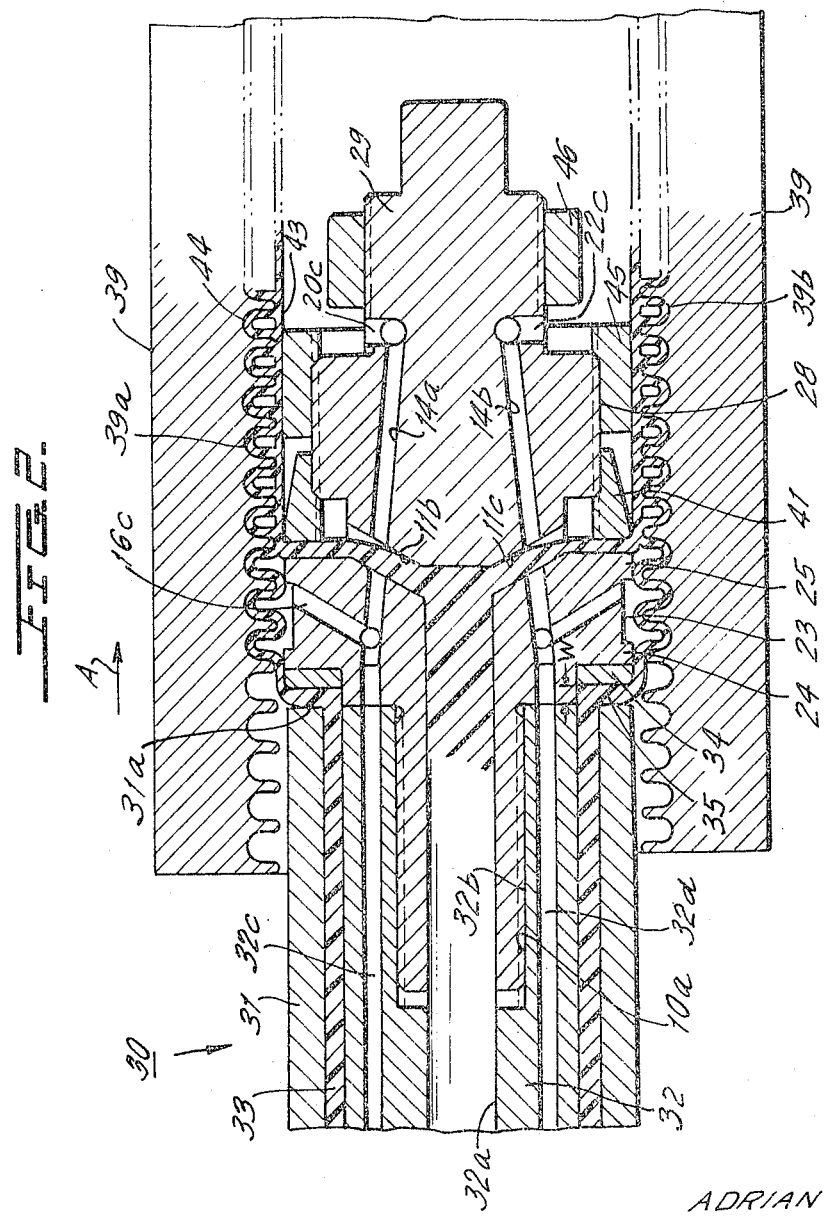

ADJUSTABLE DIE HEADS FOR EXTRUDERS AND THE LIKE

The present invention relates to extruders and more particularly to novel adjustable die head assembly for use in extruders and the like to regulate the flow of air and stock from the die head.

BACKGROUND OF THE INVENTION

Corrugated tubing finds widespread use throughout industrial, commercial and home applications. Typical uses are in the field of vacuum cleaning equipment for both industrial and home use, swimming pool equipment, and other heavy duty equipment for use as a conduit for both air and solid or granular material. A large amount of corrugated tubing is formed through an extruding precess, one such process being described in detail in Antrobus U.S. Pats. Nos. 3,280,130 issued Oct. 25, 1966 and 3,430,292 issued Mar. 4, 1969 which patents are assigned to the assignee of the present invention. Extrusion equipment of the type described in the aforementioned patents may be utilized to produce corrugated tubing having a wide variety of configurations, thicknesses and diameters. In such instances, it becomes necessary to remove certain components thereof such as, for example, the extruder die head, the dies and the like in order to change the configuration and/or characteristics of the corrugated tubing to be produced. These changes substantially affect the down time of the equipment and thereby reduce their productivity.

BRIEF DESCRIPTION OF THE INVENTION

The present invention is characterized by providing a die head assembly in which adjustability of both stock and air flow may be readily and easily performed with a minimum of equipment down time in instances where changes in the type thickness and the like of corrugated tubing is required.

The present invention is comprised of a die head member for use with extruder apparatus of the type, for example, described in the aforementioned U.S. Pats. and in copending U.S. application Ser. No. 162151 filed July 13, 1971 and also assigned to the assignee of the present invention. The die head assembly is especially adapted for use in the extruder apparatus of the aforementioned copending application wherein stock exiting from a hollow annular shaped region is caused to pass around a first flange-like portion of the die head so as to be directed toward the cooperating die molds. The die head assembly is further provided with openings for communicating with the air conduits of the extruder apparatus so as to direct the air passing through the conduits to outlet openings provided at axially spaced intervals along the die head assembly. A first group of air outlet openings are arranged so as to assist the above mentioned annular stock flow to be urged into the undulations of the die molds. The second group of outlet openings is provided to maintain the natural configuration of the corrugated tubing being formed as the die mold portions are separated therefrom.

The die head assembly is further provided with an axially aligned opening communicating with spaced outlet openings for the passage of stock therethrough to form an inner or skim layer along the corrugated tubing which layer is joined to the interior peaks so as to form a substantially smooth interior surface within the corrugated tubing, which layer is relatively thin so as not to reduce the resiliency and bending capability of the tubing. Adjustable collar means are provided at longitudinally spaced intervals along the die head assembly for adjusting the flow of both stock and air through the aforesaid outlet openings to accurately control the characteristics of the corrugated tubing being formed.

It is, therefore, one object of the present invention to provide a novel die head assembly for use in forming corrugated tubing and the like in which means are provided for adjustably controlling the flow of stock and air through the appropriate outlet openings of the die head assembly in a simple and rapid and yet accurate manner.

BRIEF DESCRIPTION OF THE FIGURES

The above as well as other objects of the present invention will become apparent when reading the accompanying description and drawings in which:

FIG. 1a is a sectional view of a die head assembly designed in accordance with the principles of the present invention.

FIGS. 1b and 1c are left and right-hand end views of the assembly of FIG. 1a.

FIG. 1d is a sectional view of the die head of FIG. 1a looking in the direction of arrows A – A'.

FIG. 1e is a sectional view of the die head of FIG. 1a looking in the direction of arrows B – B'.

FIG. 1f is a sectional view of the die head assembly of FIG. 1a looking in the direction of arrows C – C'.

FIG. 2 is a side view, partially sectionalized, showing the die head assembly of FIGS. 1a–1f mounted to an extruder assembly.

DETAILED DESCRIPTION OF THE FIGURES

The adjustable die head assembly 10 of the present invention (making specific reference to FIGS. 1a–1f) is comprised of a rigid and solid body member having a first hollow cylindrical portion 10a which is threaded along its exterior surface. An axially aligned opening 10b extends therethrough and communicates with four outwardly directed conduits 11a–11d which are radially aligned when viewed in the plane of FIG. 1e and which are diagonally aligned when viewed in the plane of FIG. 1a.

An annular shaped groove 12 is positioned immediately adjacent threaded portion 10a and is provided for receiving an 0-ring (not shown for purposes of simplicity) for firmly sealing the die head assembly to the associated extruder apparatus.

A cylindrical shaped portion 13 of the enlarged diameter is positioned immediately adjacent annular groove 12 and is provided with an annular shaped recess 13a. The annular shaped recess communicates on its left-hand end with air outlet openings provided in the extruder apparatus (to be more fully described) and on its right-hand end with a pair of diagonally aligned elongated conduits 14a and 14b. Conduits 14a and 14b each communicate with two groups of outwardly directed conduits to provide for the egress of air. As shown best in FIGS. 1a and 1f, conduit 14a communicates with conduits 15a, 15b and 15c, which communicate the air passing therethrough to outlet openings 16a, 16b and 16c, respectively. In a like manner, conduit 14a communicates with conduits 17a, 17b and 17c which couple the air flowing therethrough to outlet openings 18a, 18b and 18c, respectively. FIG. 1a shown the orientation of conduits 15c and 17c, respectively, which can be seen to be diagonally aligned in the plane of FIG. 1a.

The right-hand ends of conduits 14a and 14b (relative to FIG. 1a) communicate with conduits similar to those shown in FIG. 1f. For example, FIG. 1d shows the manner in which conduit 14a communicates with conduits 19a, 19b and 19c so as to convey the air passing therethrough to outlet openings 20a, 20b and 20c, respectively. In a like manner the right-hand end of conduit 14b communicates with conduits 21a, 21b and 21c so as to convey the air passing therethrough to outlet openings 22a, 22b and 22c, respectively. Thus it can be seen that the air passing from the extruder apparatus (to be more fully described) enters into annular recess 13a and conduits 14a and 14b so as to pass out of a first group of six openings 16a-16c and 18a-18c, which openings are longitudinally spaced from a second group of openings 20a-20c and 22a-22c, all of which openings function in a manner to be more fully described.

As can best be seen from FIGS. 1a and 1f, the openings 16a-16c and 18a-18c lie at spaced intervals along a cylindrical surface 23 which can be seen to be recessed within and embraced by a pair of cylindrical surfaces 24 and 25 which are of a diameter slightly greater than the diameter of cylindrical surface 23. The advantageous feature of this arrangement will be more fully described hereinbelow.

The outlet openings 26a-26d for conduits 11a-11d respectively (note especially FIGS. 1a and 1e) are arranged at spaced intervals along a recessed surface 27 which is provided between cylindrical surface 25 and a threaded cylindrical surface 28, both of which are of greater diameter than surface 27. Surface portion 29 which is adjacent to and of reduced diameter relative to surface portion 28 is likewise threaded for threadedly engaging an air adjust collar to be more fully described.

FIG. 2 shows the adjustable die head assembly of FIGS. 1a-1f, together with the air and stock adjust collars and stock control spacer and further is shown as being joined to the end of the extruder assembly. The extruder assembly portion 30 shown in FIG. 2 represents only the extreme right-hand portion of the assembly, a fully detailed description and showing of which is set forth in copending application Ser. No. 162151 also referred to hereinabove. For purposes of understanding the present invention it is sufficient to understand that the extreme left-hand end of the extruder apparatus is comprised of a hollow extruder member 31 having a pin member 32 concentrically aligned therewith so as to form a hollow annular region 33 defined by the interior surface of member 31 and the exterior surface of member 32. Stock flows through this region and exits in a manner to be more fully described.

Elongated pin member 32 is further provided with an axial opening 32a which also carries stock therethrough and conveys it to the die head assembly. The right-hand end of member 32 is provided with a tapped portion 32b of enlarged diameter for threadedly engaging the threaded portion 10a of the die head assembly 10. Opening 32a is aligned with the opening 10b (see FIG. 1a) of die head assembly 10 to provide for the smooth flow of stock therethrough.

A ring-shaped stock control spacer 34 (note FIGS. 1a and 2) is fitted upon circular portion 13 of die head assembly 10 and regulates the flow of stock which passes out of the gap between the right-hand surface of spacer 34 and the left-hand edge 31a of the hollow member 31. By utilizing a ring of greater or lesser thickness the amount of stock flow is thus accurately and easily controlled. The use of spacer 34 permits the die head assembly to be mounted within elongated pin 33 in a fixed position regardless of the desired flow of stock. The flow of stock is simply regulated by selecting a ring-shaped member 34 of the desired thickness to change the width W of the gap 35. This permits the use of a standard size head 10 and requires the changing of only the spacer ring 34.

The stock flows outwardly through gap 35 and around cylindrical surface portions 23, 24 and 25 in the manner shown in FIG. 2.

Elongated pin member 32 is provided with a pair of parallel conduits 32c and 32d which carry air under pressure therethrough to die head 10, whereby the air enters into annular shaped ring 13a and passes through conduits 14a and 14b to ultimately be emitted through the outlet openings 16a-16c, 18a-18c, 20a-20c and 22a-22c, as was described hereinabove. As was previously mentioned, outlet openings 16a-16c, 18a-18c are provided along surface portion 23 which is recessed relative to surface portions 24 and 25. This arrangement prohibits the stock passing surface portion 23 from entering into openings 16a-16c and 18a-18c so as to block the openings and thereby prevent the air from exiting through these openings. This would otherwise be possible since the air pressure is quite low, usually of the order of 3 psi, whereby if surface 23 were flush with surfaces 24 and 25, the stock would tend to enter into the openings and block the air outlets. The air passages 16a-16c and 18a-18c serve to urge stock flowing in the direction shown by arrows 36 intimately into the undulations 39a and 39b of the die mold members 39. Since the die mold members and the operation of the extrusion apparatus is described in detail in the aforementioned U.S. Patents, a detailed description will be omitted herein for purposes of simplicity. For the purpose of understanding the present invention, it is sufficient to understand that the die mold members are comprised of mold halves which are firmly pressed together by apparatus described in U.S. Pat. No. 3,280,130 to form a substantially continuous hollow interior. The die mold members move in the direction shown by arrow A in FIG. 2, while the remaining portion of the extruder apparatus is held stationary. The exiting stock passes outwardly in the direction shown by arrows 36 and flows into the undulations of the die mold. The corrugated tubing thus formed is passed along in the direction shown by arrow A until the die mold members are separated in the manner described in the aforementioned U.S. Patents, while the formed corrugated tubing continues to pass in the direction shown by arrow A to a location spaced from the right-hand end of the apparatus where the corrugated tubing is then wound upon a suitable take-up reel (not shown for purposes of simplicity).

As is described in detail in copending application Ser. No. 162,151 corrugated tubing sections are typically formed with a smooth cylindrical cuff being provided at each end thereof to facilitate coupling of accessory components thereto. As described in the U.S. Pat. No. 3,430,292, in order to provide a continuous extrusion operation two cuffs, one for adjacent ends of consecutively formed corrugated tubing, are extruded. During the formation of the cuffs, the stock flow through the extruder apparatus and die head assembly is terminated until the die mold members utilized for forming the corrugated portion of the corrugated tubing begin to pass by the extruder die head, at which time the stock flow for forming the skim is reinstituted.

Stock for forming the skim layer passes through axially aligned opening 32a and pin member 32 and enters into the axial opening 10b where it is emitted through openings 26a–16d after passing through radially aligned conduits 11a–11d respectively. The flow of stock is controlled by collar 41 whose interior surface is tapped so as to threadedly engage the threaded portion 28 of die head 10. By adjusting the collar accordingly, the rate of flow of the stock is regulated so as to form a thinner or thicker skim layer 43 upon the interior peaks of the corrugated tubing 44 being formed. Obviously, if desired, collar 41 may be moved as far to the left as possible (relative to FIG. 2) so as to seal openings 26a–16d and prevent the formation of a skim layer in applications wherein it is desired to form corrugated tubing without such a skim layer.

Collar 46 is provided with a tapped interior surface for threadedly engaging the threaded portion 29 of die head 10 so as to adjustably regulate the flow of air exiting through openings 19a–19c and 22a–22c. Collar 45 is likewise provided with a tapped interior surface for threadedly engaging the threaded surface 28 of die member 10 and may be cooperatively employed with collars 41 and/or 46 to regulate the flow of stock and/or air. The collars 41, 45 and 46 may be provided with set screws for locking them in any desired position.

It can thus be seen from the foregoing description that the present invention provides an adjustable die head assembly for use in forming corrugated tubing and the like in which the flow of stock and/or air emitted by the extruder apparatus may be simply and rapidly regulated through the means of adjustable collar members and a spacer member so as to permit the use of substantially standardized die head assembly which may be employed for forming corrugated tubing of a variety of thicknesses and/or materials. For example, corrugated tubing formed of a first material may necessitate adjustably positioning the spacer 34 and collars 41, 45 and 46 differently than when forming corrugated tubing of a second material which may have characteristics different from the first material.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. An extruder assembly for continuously forming plastic tubing comprising:
   a first elongated member having an exiting end surface and containing a first axial opening terminating in said end surface for feeding stock therethrough;
   a second annular opening surrounding said axial opening and terminating in said end surface for feeding air under pressure;
   a third annular opening surrounding said second annular opening and terminating in said end surface for feeding stock therethrough;
   mold means positioned adjacent to and surrounding said exiting end surface;
   a head member having a first tubular portion threadedly coupled within the axial opening of said first member, said tubular portion having an axial inlet opening communicating with the axial opening in said first member;
   a first annular portion on said head having one end surface spaced inwardly from said first tubular portion and having a first annular inlet opening communicating with the second annular opening in said first member;
   a second annular portion on said head having an end surface spaced inwardly from the end surface of said first annular portion; the outer diameter of said second annular portion being greater than the outer diameter of said first annular portion;
   the end surface of said first annular portion abutting the exiting end surface of said first member;
   the end surface of said second annular portion lying a spaced distance from said exiting end surface forming a gap therebetween for guiding stock passing through said third annular opening radially outward toward mold means;
   the periphery of said second annular portion having a first group of outlet openings;
   a first conduit in said head extending between said first annular inlet opening and said first group of outlet openings to provide a passageway for air under pressure to urge the stock exiting from said first member third annular opening against said mold means;
   the periphery of said second annular shaped portion having an annular recess, said first group of outlet openings being arranged at spaced intervals around said recess to prevent clogging of said outlet openings by stock passing around the periphery of said second annular portion;
   a third annular shaped portion positioned a spaced distance from said second annular portion and forming an annular recess between said second and third annular shaped portions;
   a second group of outlet openings arranged about said recess;
   a second conduit provided in said head for coupling said axial inlet opening to said second group of outlet openings for urging stock entering said first axial inlet opening outwardly into said recess whereby said stock is guided around said third annular shaped portion;
   axially adjustable collar means threadedly coupled to said third annular portion for controlling the flow of stock exiting from said second group of outlet openings.

2. The apparatus of claim 1 further comprising a ring shaped member positioned in the gap between said head second annular portion and said exiting end surface whereby the thickness of said ring shaped member controls the rate of flow of stock exiting from said annular gap.

3. The apparatus of claim 1 wherein said head further comprises a fourth annular portion extending outwardly from and of smaller diameter than said third annular portion;
   a third group of outlet openings spaced around the periphery of said fourth annular portion;

said first conduit further communicating with said third group of outlet openings for passing air under pressure through said third group of openings to urge stock exiting from said second group of openings into contact with the stock exiting from said gap;

an axially adjustable second collar threadedly engaging said fourth annular portion for controlling the flow of air from said third group of outlet openings.

4. An extruder head assembly for use in combination with an extruder apparatus having mold means positioned adjacent the outlet end of said extruder assembly which is provided with a first annular shaped opening for feeding stock;

a second opening for feeding stock and a third opening for feeding air at a predetermined pressure, said head assembly comprising:

an extruder head having a first end including means for releasably coupling said first end to said extruder assembly;

said head having first and second inlet openings respectively communicating with said extruder assembly second and third openings;

a first annular shaped portion spaced inwardly from said first end and forming an annular gap within said extruder assembly for guiding exiting stock;

a first group of outlet openings arranged about said annular shaped portion;

a first conduit provided in said head for coupling said second inlet opening to said group of outlet openings for urging stock passing around said annular spaced portion outwardly toward said mold means;

a second annular shaped portion positioned a spaced distance from said first annular shaped portions;

a second group of outlet openings arranged at spaced intervals about said recess;

a second conduit for coupling said first inlet opening to said second group of outlet openings whereby said stock is guided around said second annular portion;

axially adjustable means coupled to said second annular portion for controlling the flow of stock exiting from said group of outlet openings;

the extruder head is further comprised of a third annular portion adjacent to and of a smaller diameter than said second annular portion;

a third group of outlet openings arranged at spaced intervals about said third annular portion;

said first conduit communicating with said third group of outlet openings for providing a second exiting region for said air under pressure;

second adjustable means mounted upon said third annular shaped portion for regulating the flow of air exiting through said third group of outlet openings;

third adjustable means mounted upon said second annular shaped portion and cooperating with said first and second adjustable means for regulating the flow of stock and air from said head;

the surfaces of said first, second and third annular shaped portions are threaded, said first, second and third adjustable means comprising annular shaped collars each having tapped interior surfaces for respectively threadedly engaging the threaded surfaces of said first, third and second annular portions and being axially movable to provide for regulation of the rate of flow of stock and air exiting from said head.

* * * * *